Figure 4A:
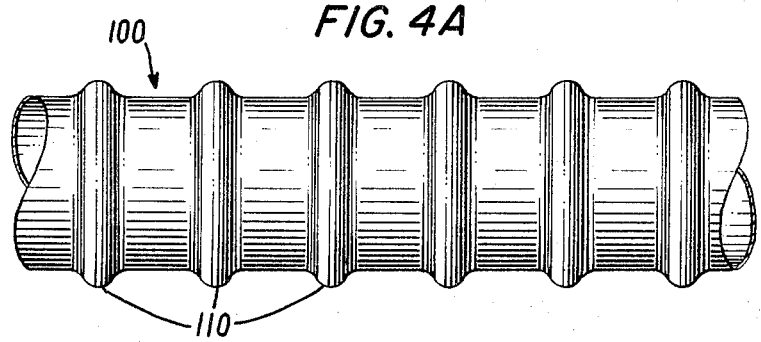

Sept. 6, 1966      W. E. CUBBERLY, JR      3,271,733
ACOUSTIC WELL LOGGING DEVICE
Filed July 8, 1964      3 Sheets-Sheet 1
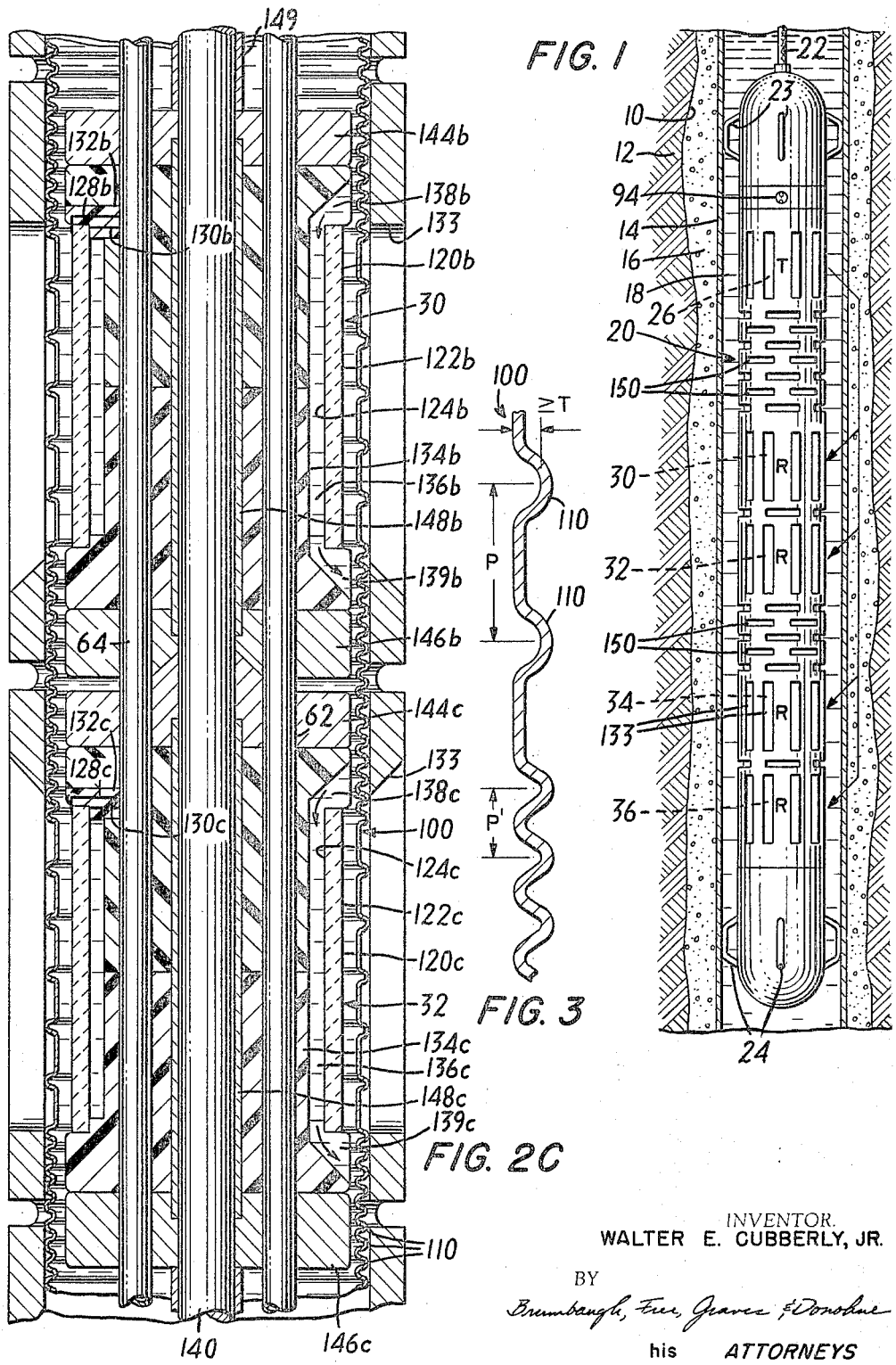
INVENTOR.
WALTER E. CUBBERLY, JR.
BY Brumbaugh, Free, Graves & Donohue
his ATTORNEYS

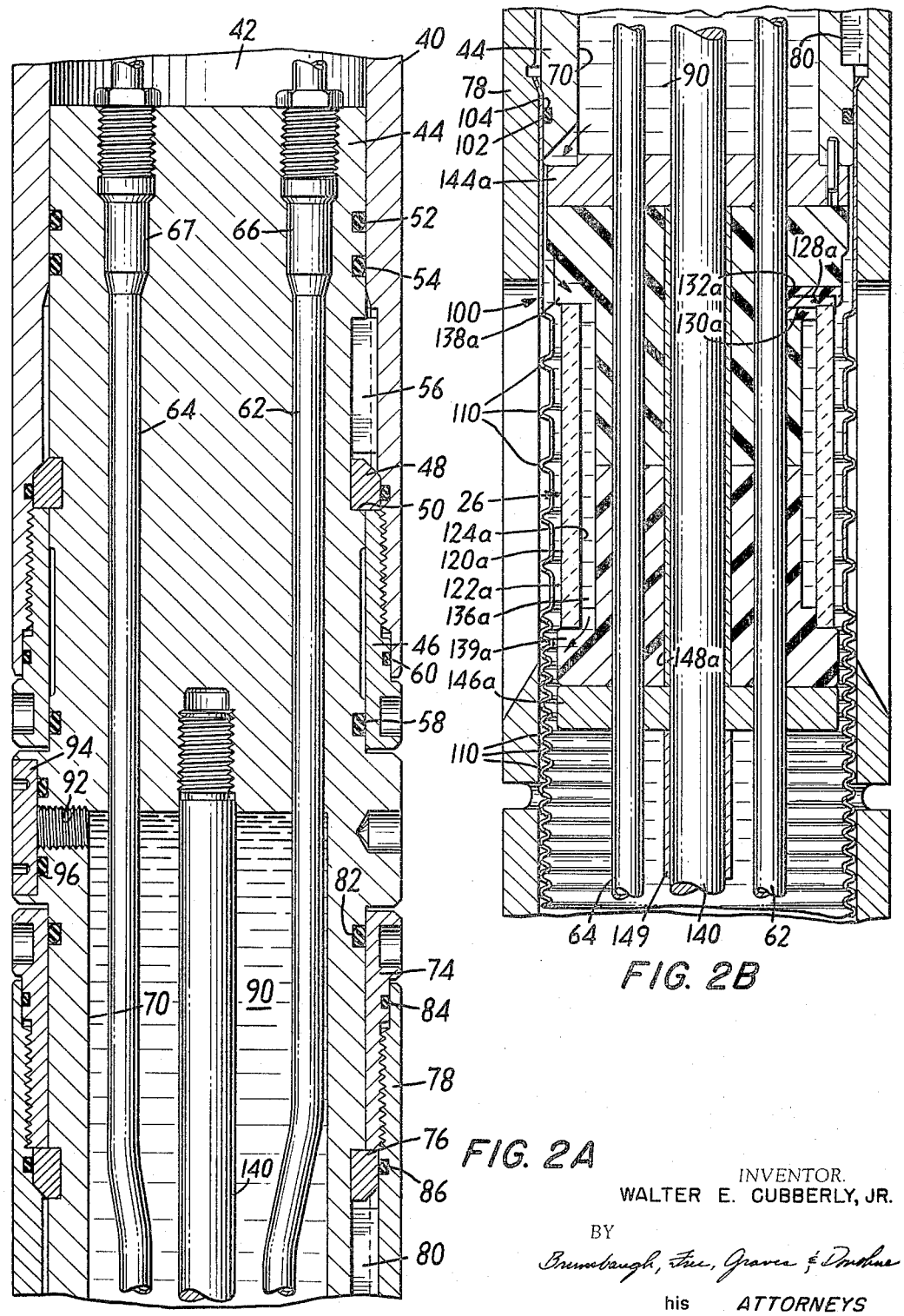

INVENTOR.
WALTER E. CUBBERLY JR.

BY his ATTORNEYS

United States Patent Office 3,271,733
Patented Sept. 6, 1966

3,271,733
ACOUSTIC WELL LOGGING DEVICE
Walter E. Cubberly, Jr., Houston, Tex., assignor to Schlumberger Well Surveying Corporation, Houston, Tex., a corporation of Texas
Filed July 8, 1964, Ser. No. 381,118
9 Claims. (Cl. 340—17)

This invention relates to apparatus for well logging and more particularly, to a novel and improved acoustic well logging device.

Various methods utilizing acoustic energy are employed for investigating geological formations and for other purposes in boreholes and wells. Usually these methods involve the generation of an acoustic wave and detection of amplitude characteristics of the wave after it has traveled a predetermined distance through surrounding earth formations, or the measurement of velocity or travel time of acoustic energy through the formations. Such methods provide important information useful in establishing the nature and the compositions of the formations traversed by the borehole.

Another use of acoustic energy is in a technique known generally as cement-bond logging. After oil bearing strata have been located in the boreholes, it is desirable to isolate these production zones from adjacent zones which may bear fluids other than oil in order to prevent mixture of those other fluids with the oil in the oil bearing strata. The isolation is accomplished by filling the space between a metal pipe or casing placed in the borehole and the surrounding formations with cement, the cement bonding firmly to the casing and the surrounding formations and preventing the flow of fluids in the annular space between them.

To determine whether the cement is effectively bonded to the well casing, acoustic signals are transmitted longitudinally along a predetermined length of the casing. The intensity of the acoustic signals after traversing a section of the well casing has been found to be quite closely related to the degree of bonding between the cement and the casing and borehole walls, the acoustic signals being considerably attenuated when the bond is satisfactory but only moderately attenuated if the bond is poor or absent altogether.

In well logging apparatus utilizing acoustic energy, whether it be for investigating formations surrounding a borehole or for testing the cement bond, the logging device used generally comprises an acoustic signal transmitter and one or more acoustic signal receivers mounted on a suitable support at a predetermined spacing and suitably housed. The transmitter unit and receiver units are generally similar and usually comprise a piezoelectric or magnetostrictive electro-acoustic transducer element which responds to electrical energy and generates acoustic waves, in the case of a transmitter, or responds to acoustic energy in an axial direction and generates an electrical output signal, in the case of a receiver.

A number of difficulties arise in providing an acoustic well logging device which will operate efficiently under the great pressures existing at the considerable depths in which they are often used. Thus, the interior of an acoustic well logging device is usually filled with oil or another suitable liquid, and the device arranged so that the external pressure in the borehole or well acts on the internal liquid to create pressures inside the device substantially equal to those outside.

It is also important that the housing for the transducer units and other parts of the logging device not significantly attenuate acoustic energy passing outwardly to the casing or the borehole from the transmitter transducer or attenuate acoustic energy passing inwardly to the receiver transducers. Moreover, the device should be designed to prevent the entry of borehole fluids into the interior liquid chamber in which the transducers are contained, since such fluids often contain substances harmful to the operating equipment therein.

A further requirement of an efficient logging device is that transmission of acoustic energy through the housing and supporting structure be reduced as much as possible. Otherwise, interference between the acoustic signals passing through the borehole strata or a well casing, which are being measured, and acoustic signals conducted by the housing or other parts of the logging devices itself would occur.

Briefly, the structure of an acoustic well logging device should include a fluid tight chamber for the transmitter and receivers and at the same time should provide as little conduction of acoustic energy as possible between the transmitter and each of the receivers and enable the radial passage of sonic energy to and from the transducers without significant attenuation. It is the object of the present invention to provide improved acoustic logging apparatus meeting all of the foregoing requirements in a simple, reliable manner.

There is provided, in accordance with the invention, a sleeve of fluid impermeable material surrounding spaced-apart electroacoustic transducers carried by the device, the sleeve having closely spaced transversely extending convolutions in at least the portions thereof between the transducers for reflecting acoustic signals into the surrounding medium and/or reflecting them back to their source, thereby limiting the transmission of acoustic signals directly between the transducers. At the same time, transmission of acoustic energy between the transducers and the surrounding borehole casing or formations remains unimpaired. Sealing means are provided between a central support member of the device and the sleeve to form a closed fluid-tight chamber for the transducers.

Preferably, the sleeve is made of a thin metal sheet and is cylindrical. The convolutions may comprise a series of transversely extending offsets formed in the sleeve having depths at least equal to the thickness of the sleeve material. The convolutions or offsets may be in the form of circumferential rings lying in spaced-apart planes normal to the axis of the sleeve, may constitute a continuous spiral or helix around the sleeve, or may be a plurality of circumferentially spaced-apart series of grooves, the grooves in each series overlapping the spaces between grooves in the adjacent series.

Figure 4B:
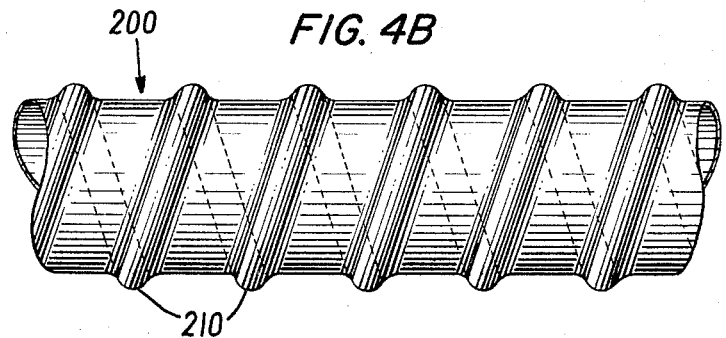
Figure 4C:
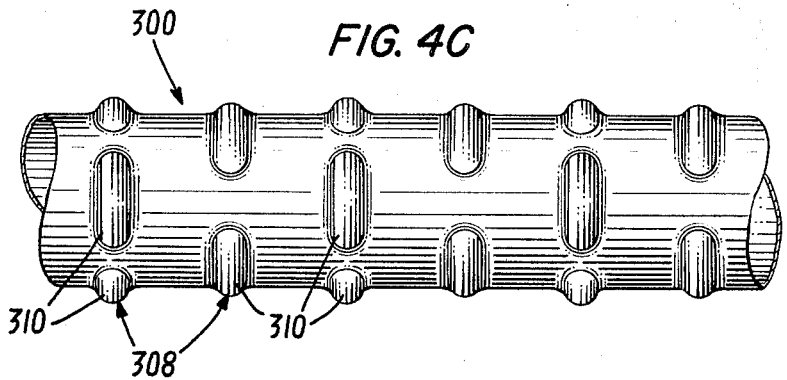

For a better understanding of the invention, reference may be made to the following description of an exemplary embodiment, taken in conjunction with the figures of the accompanying drawings, in which:

FIG. 1 is a cross sectional view through a borehole having a cemented well liner therein and showing an acoustic well logging device in position in the borehole;

FIGS. 2A and 2C together constitute a partial cross sectional side view of the upper portion of the well logging device of FIG. 1, illustrating the inner construction thereof;

FIG. 3 is a longitudinal cross sectional view of a segment of a convoluted sleeve used in the well logging device; and FIGS. 4A, 4B and 4C illustrate different embodiments of the convoluted sleeve of the invention.

The exemplary embodiment of a well logging device, according to the invention, is described herein in connection with cement bond logging, but it will be understood that the principles of the invention are applicable to acoustic well logging equipment used for other purposes.

Referring to FIG. 1, a borehole 10 drilled through earth strata 12 is provided with a steel casing 14. A cement liner 16 deposited between the outer wall of the casing 14 and the borehole 10 prevents the passage of fluids along the space between the casing 14 and the borehole 10. At this point in the operations of completing the well, the well casing has not been pumped out and contains a mixture of various fluids 18.

The acoustic well logging device, which is represented generally by the reference numeral 20, is suspended in the well by a cable 22, which may comprise a load bearing cable and one or more electrical conductors for conveying electrical signals from the device to a recorder and other equipment (not shown) on the surface and for carrying electrical signals from the surface to the device. It is maintained centrally positioned in the well by upper and lower centralizers 23 and 24, respectively.

The illustrated embodiment of the device includes a transmitter 26 at the upper end, an upper pair of closely spaced receivers 30 and 32 and a lower pair of closely spaced receivers 34 and 36. (The structure of the transmitter and receivers will be described in more detail hereinafter.) This arrangement of a transmitter and receivers is merely exemplary of various arrangements that can be provided, but it presents the problems encountered in acoustic well logging apparatus particularly well.

Specifically, problems of interference between acoustic signals being measured and signals conducted through the support and housing structure of the device itself are encountered. The two pairs of receivers are relatively closely spaced, and thus the necessity of isolating the receivers from each other, that is, preventing the transmission of any significant acoustic energy through an element or elements of the device itself is particularly important.

It will be understood that in addition to the transmitter and the receivers, the device 20 also includes various electronic components which are not shown or described herein, inasmuch as they are well known to those skilled in the art.

FIGS. 2A, 2B and 2C together illustrate in detail the upper part of the device 20 of FIG. 1, including the transmitter 26 and the upper pair of closely spaced receivers 30 and 32. A showing of the lower part of the device has not been included since it is similar in all significant respects to the portion of the upper part containing the upper pair of receivers.

Referring now to FIG. 2A, which shows the upper segment of the device located above the transmitter 26 an upper housing element 40 defines a closed chamber 42 which contains some of the electronic components mentioned above. The housing element 40 is installed over an upper mounting support member 44 by threading it onto a collar 46 which bears against a split-ring retainer 48 received in a groove 50 in the member 44. O-ring seals 52 and 54 are provided between the element 40 and the mounting member 44 to seal the chamber 42. The member 44 is aligned by a key and keyway 56, and the collar 46 is then rotated relative to the support member 44 to pull the housing element 40 into place thereon. The collar 46 is provided with O-ring seals 58 and 60 to further close off the chamber 42, moreover, to prevent corrosion and possible freezing of the threaded joint. It will be observed that the threading of the upper housing element 40 onto the mounting member 44 enables it to be easily removed for servicing and replacing of the electronic units contained in the chamber 42.

Bores are formed in the housing member 40 for receiving electrical conduits 62 and 64, which have suitable conductor seals 66 and 67 for fluidly sealing the conductors from the electrical units in the upper chamber 42.

Formed in the lower end of the support member 44 is a large bore 70. Threaded onto a collar 74 surrounding the lower walls of the housing member and bearing against a split ring 76 is a main external housing 78 of the device. The housing 78 is installed in the same manner as the upper housing element 40, that is, by turning the collar 74 to draw the sleeve 78, which is prealigned with a key 80, onto the lower end of the support member 44. Seals 82, 84 and 86 are provided between the ring 76, member 44 and housing 78.

The bore 70 in the lower end of the support member 44 defines the upper end of an interior chamber 90 which is filled with a suitable liquid, such as silicone oil. To enable filling the chamber 90, an orifice 92 is provided at the upper end of the bore 70 through the lower wall portion of the member 44, and a cap 94 engaging an O-ring seal 96 is threaded into the orifice. To fill the chamber, it is evacuated by inserting a conduit coupled to a vacuum pump into the orifice 92, and when the vacuum has been drawn, the entire device is immersed in the silicone oil, the vacuum conduit disconnected and the cap 94 affixed.

Referring next to FIG. 2B, the major portion of the walls of the chamber 90 is formed by a cylindrical sleeve 100 (which will be described in detail hereinafter), the upper end of which is received between the lower end of the support member 44 and the inner wall of the exterior housing 78 and sealed therein by an O-ring seal 102. The seal 102 is firmly compressed into an inwardly extending groove 104 in the member 44 and forms a fluid-tight barrier between the chamber 90 and the exterior of the device. The sleeve preferably extends continuously along the length of the device to a point below the lower pair of receivers 34 and 36 where a similar fluid tight seal is provided. If desired, however, the sleeve may be divided into segments, each surrounding selected ones of transducers.

The transmitting transducer and the receiving transducers are all identical in form, and all are mounted in the same manner. The same reference numerals are therefore assigned to each transducer, and the letter suffixes *a*, *b* and *c* are added to designate the elements of, respectively, the transmitter 26, the receiver 30 and the receiver 32. Each transducer comprises a cylindrical sleeve 120 of a material, such as barium titanite ceramic, capable of transducing electrical signals into mechanical or acoustic vibrations or, conversely, mechanical vibrations into electrical signals. The inner and outer walls 122 and 124 of the transducer sleeve 120 are coated with an electrically conductive material (not illustrated), and the conductive coatings are connected to electrical conductors 128 and 130 extending outwardly through a sealing insert 132 from the conduits 62 or 64.

To enable acoustic signals to pass radially to and from the transducers the main outer housing member 78 is provided with, as best shown in FIG. 1, spaced-apart longitudinal slots 133 located outwardly of the transducers.

The transducer sleeves 120 are each supported by a tubular support ring 134 which is formed in two abutting sections and is provided with shoulders for supporting the transducer. An annular cavity 136 is left between the major portion of the interior wall of the transducer sleeve 120 and communicates with the fluid chamber 90 by means of channels 138 and 139 formed in the tubular member so that pressure on the inside and outside walls of the transducer sleeve will be equal. The support rings 134 are mounted on a central mandrel 140 extending axially through the logging device and threaded into the upper support member 44. The mandrel is made of a material having a low characteristic velocity of sound conduction, such as "Teflon." End positioning rings 144 and 146 and tubular spacers 148 and 149 retain the support rings 134 at predetermined spacings. The upper positioning ring 144*a* of the transmitter transducer 26 bears against the lower end of the upper support member 44, as shown in FIG. 2B, and a channel is formed in the member 44 to enable the liquid in the chamber 90 to pass by the ring 144*a*.

To further isolate the electroacoustic transducers from the support structure, the support rings 134 are "Teflon,"

in order to restrict the transmission of acoustic energy. Similarly, the main housing sleeve 78 is provided, referring again to FIG. 1, with series of transverse slots 150 in the spaces between each of the transducer sections, the slots of each series staggered with relation to those of the adjacent series. The transverse slots interrupt all longitudinal paths for transmission of acoustic signals between the respective transducers, that is, break up any direct transmission paths through the housing itself, and prevent interference with the signals being measured.

Returning now to the sleeve 100, which enables the above-described advantages of the invention to be obtained, it will be seen from FIGS. 2A, 2B and 2C, that the sleeve 100 is formed with transversely extending convolutions or offsets 110, the offsets being spaced at predetermined pitch distances along susbtantially the entire length of the sleeve 100. First of all, the offsets 110 serve to considerably strengthen the thin-walled sleeve 100, but more importantly, acoustic signals impinging on any part of the sleeve are reflected into the surrounding medium where they are attenuated or they are reflected back to the source. Accordingly, the conduction of signals in the lengthwise direction from one part of the sleeve to another part of the sleeve is substantially eliminated.

Referring particularly to FIG. 3, in order to effectively reflect acoustic signals and prevent their conduction axially along the sleeve without unduly restricting their conduction radially, the offsets 110 should be formed to a depth equal or greater than the thickness T of the sleeve, and the pitch distance P or P' of the offsets should be within the range of about 10 to 100 times the thickness T of the sleeve. Referring again to FIG. 2B and also to FIG. 2C, the convolutions or offsets in the portions of the sleeve disposed about the electroacoustic transducers are relatively widely spaced, to minimize attenuation of acoustic energy passing radially inwardly and outwardly through the sleeve, while in other regions of the sleeve, the grooves 110 may be more closely spaced as shown. The closer spacing not only provides desirable restriction of longitudinal conduction of acoustic energy but provides mechanical flexibility in the sleeve to accommodate the small amount of bending that occurs during handling of the tool or during its passage through irregularities in the borehole or well. Preferably, the sleeve 100 is made of a non-corrosive metal and is relatively thin walled, say about .015 inch.

The offsets 110 in the embodiment illustrated in FIGS. 2A, 2B and 2C of the drawings are continuous about the circumference of the sleeve 100 and lie in planes substantially normal to the axis of the sleeve and the device, as can be better seen from FIG. 4A. However, other forms of offsets may be utilized such as, for example, a continuous spiral 210 of uniform or varying pitch extending the entire length of the sleeve 200 (except for the end portions) shown in FIG. 4B, or spaced-apart series 308 of discontinuous or segmented offsets 310, the offsets 310, of each series staggered in relation to those of the adjacent series, such as in the sleeve 300 shown in FIG. 4C. The only limitation on the form of the offsets is that they be disposed along all longitudinal planes of the sleeve.

Thus, there is provided, in accordance with the invention, an acoustic well logging device in which the electroacoustic transducers are contained in a fully fluid-tight chamber, which, preferably, extends continuously through the device, the walls of the chamber formed by a sleeve having transverse convolutions or offsets formed therein for reflecting acoustic signals into the surrounding medium and preventing their communication between the several transducers.

The well logging device described above is merely one embodiment employing the principles of the present invention, and many modifications and variations of it can be made by those skilled in the art without departing from its spirit and scope. All such modifications and variations are intended to be within the scope of the invention as defined in the appended claims.

I claim:

1. An acoustic well logging device comprising an elongated support member, electroacoustic transducers mounted at spaced-apart locations on said support member, a sleeve of fluid impermeable material surrounding said transducers and having closely spaced transversely extending convolutions in at least the portion thereof between said transducers for restricting the transmission of sonic signals directly between said transducers, and sealing means between said support member and said sleeve to form a fluid tight chamber for said transducers.

2. An acoustic well logging device comprising an elongated support member, electroacoustic transducers mounted at spaced-apart locations on said support member and defining a cavity therewith, a cylindrical thin-walled metal sleeve surrounding said transducers and extending therebetween and having transversely extending offsets formed therein for restricting the transmission of acoustic signals directly between said transducers, and sealing means between said support member and the opposite ends of said sleeve to form a fluid tight chamber for said transducers.

3. An acoustic well logging device comprising an elongated support member, electroacoustic transducers mounted at longitudinally spaced-apart locations on said support member and each defining a cavity with said support member, a cylindrical thin-walled sleeve surrounding said transducers and extending therebetween, said sleeve having a series of transversely extending offsets formed therein for restricting the transmission of acoustic signals directly between said transducers, said sleeve spaced outwardly of said transducers and defining annular spaces therewith, sealing means between said support member and said sleeve to form a fluid-tight chamber for said transducers which includes said cavities and said annular spaces, and fluid means filling said chamber.

4. An acoustic well logging device according to claim 3 wherein said offsets in said sleeve have a depth greater than the wall thickness of said sleeve.

5. An acoustic well logging device according to claim 3 wherein said offsets extend circumferentially about the sleeve and are pitched at from about 10 to about 100 times the wall thickness of the sleeve.

6. An acoustic well logging device according to claim 5, wherein said offsets constitute a continuous helix about said sleeve.

7. An acoustic well logging device according to claim 5, wherein said offsets are annular and lie in planes normal to the axis of the device.

8. An acoustic well logging device according to claim 5, wherein said offsets are circumferentially spaced-apart grooves arranged in longitudinally spaced-apart series, the grooves of each series staggered in relation to those of the adjacent series.

9. In an acoustic well logging device having an elongated support member and electrostatic transducers mounted at spaced-apart locations on the support member and defining cavities with the support member, the improvement in combination therewith comprising a sleeve of fluid impermeable material surrounding said transducers and extending therebetween, said sleeve having closely spaced convolutions in at least the portion thereof restricting the transmission of acoustic signals therealong between said transducers, and sealing means between the support member and said sleeve to form a closed fluid-tight chamber for said transducers.

No references cited.

BENJAMIN A. BORCHELT, *Primary Examiner.*

P. A. SHANLEY, *Assistant Examiner.*